United States Patent [19]

Vermoortele et al.

[11] Patent Number: 5,399,197
[45] Date of Patent: Mar. 21, 1995

[54] BISMUTH PHOSPHOVANADATE AND/OR BISMUTH SILICOVANADATE BASED YELLOW PIGMENTS AND PROCESSES OF MANUFACTURING THEREOF

[75] Inventors: Frank Vermoortele, Lille, France; Emile J. Buyse, Mouscron, Belgium

[73] Assignee: Colour Research Company (Coreco) Ltd., Dublin, Ireland

[21] Appl. No.: 920,570

[22] PCT Filed: Dec. 17, 1991

[86] PCT No.: PCT/BE91/00090

§ 371 Date: Sep. 16, 1993

§ 102(e) Date: Sep. 16, 1993

[87] PCT Pub. No.: WO92/11205

PCT Pub. Date: Jul. 9, 1992

[30] Foreign Application Priority Data

Dec. 19, 1990 [BE] Belgium ............................ 9001230

[51] Int. Cl.$^6$ .................. C09C 1/00; C01G 29/00; C01G 31/00
[52] U.S. Cl. .................................................. 106/479
[58] Field of Search ........................................ 106/479

[56] References Cited

U.S. PATENT DOCUMENTS

| | | | |
|---|---|---|---|
| 4,026,722 | 5/1977 | Hess | 106/479 |
| 4,455,174 | 6/1984 | Wienand et al. | 106/479 |
| 4,851,049 | 7/1989 | Wienand et al. | 106/479 |
| 5,186,748 | 2/1993 | Erkens et al. | 106/479 |

FOREIGN PATENT DOCUMENTS 74049 3/1983 European Pat. Off.
63-61080 3/1988 Japan.

*Primary Examiner*—Helene Klemanski
*Attorney, Agent, or Firm*—Kolisch, Hartwell, Dickinson, McCormack & Heuser

[57] ABSTRACT

A bismuth vanadate based yellow inorganic pigment is disclosed together with a process for making bismuth based yellow inorganic pigments.

19 Claims, 5 Drawing Sheets

BISMUTH PHOSPHOVANADATE AND/OR BISMUTH SILICOVANADATE BASED YELLOW PIGMENTS AND PROCESSES OF MANUFACTURING THEREOF

OBJECT OF THE INVENTION

The present invention refers to inorganic yellow pigments based on bismuth phosphovanadate and/or silicovanadate as well as processes of manufacturing and obtaining said pigments.

Ideally a yellow pigment must have the following characteristics:
1) coloring power, that is, when it is mixed with a large quantity of white pigment, it must hold its own vivid color;
2) intensity, that means it must have a pure color and be exempt of dullness or greyness;
3) light solidness, that is the color must be maintained when the pigmented object is exposed to light;
4) absence of bleeding, that means no color migration into the pigmented object.

Moreover many applications require a great opacifying power of the pigment, that means the capacity of covering and opacifying efficiently the colored objects.

The main yellow pigments are lead chromates, cadmium sulfides, nickel titanates, hydrated iron oxides and various organic pigments principally based on dinitrogenated compounds.

The use of the lead chromates and cadmium sulfides is presently limited by their possible toxicity; nickel titanates and iron oxides are opaque, but are deficient either in coloring power or in color purity. The organic pigments they have generally a low covering power, are expensive to very expensive and bleed frequently. The bismuth vanadate-based pigments present a very pure color, great coloring power, a good opacity and no bleeding. The present invention has as an object to provide new pigments based on bismuth phosphovanadate and/or bismuth silicovanadate which have all characteristics and qualities of pure bismuth vanadate.

The present invention also refers to new manufacturing processes for bismuth vanadate compounds according to the present invention.

CHARACTERISTIC ELEMENTS OF THE INVENTION

The new yellow inorganic pigments based on bismuth phosphovanadate and/or silicovanadate according to the present invention are non toxic and have a good covering power, a good coloring power, a great color purity, a good light solidness and do not bleed in the environments where they are used. Those pigments have the following chemical formula:

where:

L is Si or simultaneously Si and one or various elements chosen amongst Ti, Ge or Zr; or still simultaneously Si and one or various elements chosen amongst Ti, Ge or Zr and one or various elements of the group IIIa;

M is V or simultaneously V and one or various elements chosen amongst the group Vb or P;

N is Mo or W;

a varying from 1 to 4/3, and b, c and d varying from 0 to 1;

under the following conditions:
  c is higher than 0, and
  if b=0 then M must represent simultaneously V and one or various elements chosen amongst the group Vb or P.

The invention also refers to manufacturing processes for bismuth phosphovanadate and silicovanadate.

According to a preferred embodiment of the invention, a precipitation of a "raw product" in wet medium is firstly made, then this raw product is converted into a pigmentary powder through a calcination step in the ambient conditions. The precipitation of the raw product is made under well controlled conditions by mixing an acid solution of bismuth with an aqueous solution containing at least vanadate anions and silicate and/or phosphate anions and possibly molybdate and/or tungstate anions or titanium, germanium, zirconium, niobium, phosphorus, boron or aluminium compounds, preferably titanate, germanate, zirconate, niobate, phosphate, borate, aluminate or silicoborate in presence of a base and at a temperature between 20° and 100° C., preferably between 40° and 80° C. The precipitated product is then separated from the mother-waters. These latter are in the case of the invention exempt of heavy metals and other ions such as Bi, Mo, P, Zn, . . . The precipitate is then washed and dried. It is calcinated during 0.5 to 5 hours at a temperature of 400° to 700° C.

Nevertheless further embodiments of the process of manufacturing the pigments according to the present invention can be possible. Particularly, solid compounds of bismuth and vanadium, silicon, phosphorus, molybdenum can be intimately mixed and the mixture can be then directly calcinated. The formation of the bismuth vanadate-based pigmentary compound is then carried out by chemical reaction in solid phase, as it is also done for the pigments of the rutile and spinelle family.

Practically there are mixed very intimately oxides or compounds which are converted into oxides under the action of temperature; into hydrated oxides, hydroxides, carbonates, phosphates, silicates, acetates . . . To carry out the mixing, there are used intensives mixers (of blade or ploughshare types), breaker mills, turbofeeders, mixers-breakers . . . When the intimate mixing is completely carried out, it is calcinated directly in a kiln at temperatures comprised between 400° and 1100° C. during many hours. When calcination is complete, the product is cooled progressively and there is obtained a yellow product which presents after wet grinding, drying and dry grinding the pigmentary properties of bismuth vanadates.

The treatment can be also made in one step by precipitation in the presence of catalyst and promoter ions. In that case a bismuth salt is precipitated by vanadate, molybdate, silicate and/or phosphate, borate, aluminate . . . . ions. When the reaction is over, the reaction mixture is again stirred for a more or less long period between 1 and 10 hours at temperatures between 80° and 100° C. or even higher and at a slightly acid pH between 3 and 7. The humid state aging leads to a yellow cristallized product having the pigmentary characteristics of bismuth vanadates.

SUMMARY OF THE ART

The bismuth vanadate used among others as a yellow pigment for coloration of plastics and paints or as a catalyst for oxidation of olefins is a known chemical compound (U.S. Pat. No. 3,843.554, U.S. Pat. No. 4,115,142).

Various processes are described to manufacture pure or complex materials based on bismuth vanadate with good pigmentary properties. Generally a wet precipitation of the bismuth compound is firstly made by vanadate anions or possibly in presence of molybdate and/or tungstate and possibly in presence of other cations. Then thermal or chemical treatments give the so formed compounds the necessary cristalline and pigmentary properties. Finally various post-treatments can improve the heat resistance in plastics and the light solidness in paints (U.S. Pat. No. 4,063,956, U.S. Pat. No. 4,115,141, U.S. Pat. No. 4,752,460). Also dry mixing and calcination can be made with no wet calcination step (DE-3 315 850, U.S. Pat. No. 4,251,283 ).

The formation of "multiphase compounds" based on $BiVO_4$ allows bright yellow pigments to be obtained less expensively than those compounds based on the only phase $BiVO_4$. Thus the simultaneous presence, besides the bismuth vanadate, of other compounds such as sulfates, phosphates, oxides, molybdates and tungstates is claimed in various patents : GB-2 034 342, DE-3 106 625, DE-3 135 281.

The chemical formula of those multiphase compounds based on bismuth vanadate can be written as follows:

$$x\ BiVO_4 . y\ Bi\ Me\ O_4 . z\ ABO_4$$

Me being generally Mo and/or W $ABO_4$ being any oxygenated compound.

A multiphase compound based on $2BiVO_4/BiPO_4/AlPO_4$ is for example produced by calcination of the wet mixture of bismuth phosphate, pentavalent vanadium compounds and trivalent aluminium. The relative proportions of $Al_2O_3$ and $P_2O_5$ as well as the calcination temperature (700°–1100° C.) condition the colors obtained which can go from greenish yellow up to orange yellow (DE-2 933 778).

The document JP-63061080 has also made known another bi-phase compound $BiVO_4.xBiPO_4$ which is obtained by calcination of a mixture of powders containing bismuth, vanadium and phosphorus compounds. That compound is to be used as a temperature reversible indicator material and presents that essential characteristic to modify its color depending on temperature.

Moreover a European patent application published under N° EP-A-0 441 101 on Aug. 14, 1991 and claiming a priority of U.S. application Ser. No. 463,639 of Jan. 11, 1990 describes pigments based on bismuth phosphovanadate.

DETAILED DESCRIPTION OF THE INVENTION

Figure 1:
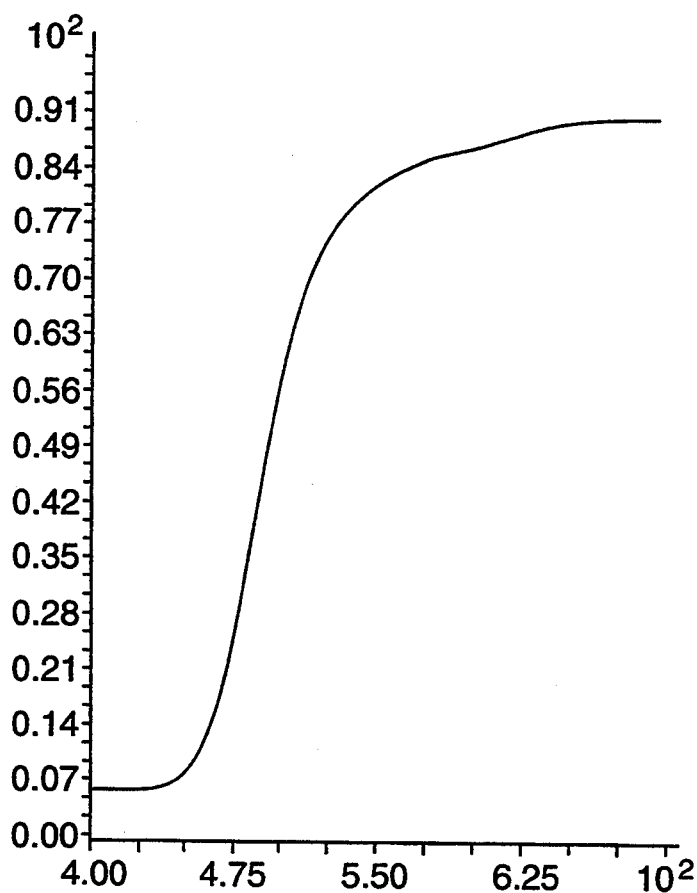

Yellow pigments with high coloring power based on bismuth phosphate and/or silicate/vanadate can be obtained by mixing and particularly by co-precipitation in absence of fillers and divalent and trivalent compounds based on Mg, Ca, Ba, Zn, Fe, . . . followed by a calcination at temperatures lower than 700° C.

The composition of the preferred yellow inorganic pigments according to the present invention meet to the following chemical formula:

$$Bi_{4/3-x/3+xy/2}\ [L^{IV}_{1-x}M^V_{x-3xy/2}N^{VI}_{xy}]O_4 \qquad \text{(formula I)}$$

In that same chemical composition, bismuth is always trivalent, the ions L, M and N represent respectively tetravalent and/or trivalent, pentavalent and hexavalent ions.

More precisely L represents silicon (and/or titanium, germanium, zirconium, boron or aluminium); the value of $[1-x]$ being generally from 0 to 1/8, that means $7/8 < x < 1$.

M is a mixture of vanadium ions and phosphorus and/or niobium ions with a ratio higher than one, N represents hexavalent molybdenum and/or tungstene; the value of xy being generally from 0 to 2/3.

For commodity, that formula can be written in a simpler way as follows:

$$Bi^{III}_a L^{IV}_b M^V_c N^{VI}_d O_4 \qquad \text{(formula II)}$$

where:
a=4/3−x/3+xy/2
b=1−x with $0 \leq b \leq 1/8$
c=x−3xy/2 with $0 < c \leq 2/3$
d=xy with $0 \leq d \leq 2/3$ For d=0 (and y=0) there will be obtained a bismuth silico(phosphovanadate); for b and d=0 (x=1 and y=0), there will be obtained a pure phosphovanadate. If d is different from 0, it should vary from zero to 2/3 with preferably values from 0.1 to 0.4. As regards the phosphorus/vanadium ratio, it can be varied within the following limits:

$$0 \leq \frac{phosphorus}{vanadium} \leq 1$$

Preferably the values will be chosen between 1/100 and 1/4.

The pigments according to the present invention are mainly manufactured with bismuth vanadate, phosphate, silicate, molybdate and/or tungstate. They are not formed with true solid solutions as it could be deducted from above suggested general chemical formula; in reality those pigments are highly intimate mixtures of various quite similar phases as they crystallise in the monoclinic and orthorhombic or cubic systems.

The preparation of the pigments according to a preferred embodiment of the invention can be carried out through the following steps: heat co-precipitation of the "raw product", separation of that product by filtration, careful washing and final calcination to get the pigment which still goes through a wet grinding.

The raw product, which is a mixture of bismuth vanadate, bismuth molybdate, silicate and/or phosphate and/or other bismuth compounds is obtained preferably by precipitation in an aqueous medium, as there is obtained in that case an extremely intimate mixture of different bismuth compounds and the stoichimetric composition of the raw product is in that case perfectly controlled. Consequently the final pigmentary product is perfectly homogenous, the calcination temperature is not very high and it is not necessary to use additives like fluxes. Moreover the wet mixing does not lead to rejection of nocive soluble salts and the reproducibility of the pigmentary characteristics is perfect.

The co-precipitation is made by heat mixing an aqueous solution containing vanadate, molybdate, silicate, phosphate, tungstate, borate and/or aluminate ions with a solution of a bismuth salt. The temperature of those solutions is adjusted carefully so as to be maintained between 20° and 100° C., preferably between 40° and 80° C. The solutions can be added to each other either successively or simultaneously.

If the procedure is successive, the process consists in pouring on a non hydrolyzed acid solution of a bismuth salt a mixture of vanadate and/or silicate or phosphate, molybdate, . . . during 0.25 to 3 hours, generally between 0.75 and 1.5 hours. While adding the solutions, it will be taken care that the stirring is efficient and the temperature maintained between 40° and 80° C. The pH of the reaction mixture goes up gradually from zero or less to a value near one. Then by dripping an alkaline solution the pH is increased up to a value from 2 to 6, preferably from 3.5 to 4.5.

If the procedure is simultaneous, the process consists in pouring together in a reactor equipped with a highly efficient stirrer the hot solution of bismuth and the hot solution comprising the anions; the operation is preferably made with an advance of 1 to 10% of the bismuth solution. The pouring time of the solutions is from 0.5 to 2 hours, preferably 0.75 to 1.5 hours. During the whole pouring time, care is taken that the temperature of the reaction mixture is maintained between 40° and 80° C. Afterwards stirring is still continued for an interval between 0 and 2 hours, preferably between 10 and 30 minutes. The pH, which is near one, is then brought gradually up to a value between 2 and 6, preferably between 3.5 and 4.5 by addition of a concentrated base such as caustic soda, sodium carbonate, potassium hydroxide or ammonia solution.

In such a way a not very cristalline compound of creamy yellow color is precipitated, which is a highly intimate mixture of the components of the final pigment. Before separating that raw product from the mother-waters, it can be left to mature for 0.5 to 5 hours in order to make the precipitation totally completed. Consequently every trace of heavy metal ions or other requiring expensive purifications can be eliminated from the mother-waters. The product obtained is then filtrated and separated from the mother-waters; the paste produced is then washed with water and dried.

The calcination is used to convert the raw product which is in a more or less amorphous condition into a crystalline pigment with a beautiful pure yellow color. That thermal treatment or calcination is carried out in presence of air in a kiln at a temperature varying between 400° and 700° C., preferably between 550° and 625° C. If lower temperatures are used, the product will not be converted into an homogenous cristalline compound and the color will remain quite dull. If the working temperatures are too high, there is a risk to obtain a very hard product with a dirty deep color.

Calcination is carried out in an electrically-heated kiln of tunnel furnace type, muffle furnace type or even rotating furnace which guarantee an excellent homogeneity and allow a continuous and constant production. The calcination time varies between 0.5 and 5 hours. Calcination is carried out in an oxidative environment either in the ambiant air or with compressed air or with a mixture of air and oxygen.

After the calcination, the pigment is progressively cooled. Nevertheless the preparation process according to the present invention makes possible to cool the pigment rapidly. In less than one hour the temperature can be decreased 150° C. and even more without altering the coloristic and pigmentary characteristics.

Finally the calcined pigment is ground in a wet medium with ball mills, sand mills, microball mills, . . . With such a wet grinding (contrary to a more conventional dry grinding) a pigment can be obtained with a very pure color and a very fine texture. After that wet grinding the product is filtrated, dried and finally ground conventionally.

As a trivalent bismuth salt there can be used bismuth nitrate, bismuth carbonate, bismuth acetate and any other aqueous solution of those salts sufficiently acidified so as not to be hydrolyzed. Generally an aqueous solution of bismuth nitrate $Bi(NO_3)_3.5H_2O$ in nitric acid is used.

As a vanadium source there can be used the pentavalent combinations such as $V_2O_5$, $Na_3VO_4$, $Na\,VO_3$, $NH_4VO_3$. The alkaline metavanadates are preferred.

As a source of molybdenum and/or tungsten, sodium molybdate and tungstate $Na_2MoO_4.2H_2O$ and $Na_2WO_4.2H_2O$ can be used particularly.

As a source of phosphorus, 85% phosphoric acid $H_3PO_4$ as such or an alkaline phosphate can be used.

As a source of silicon there can be used anhydrous sodium metasilicate, liquid sodium silicates, liquid potassium silicates, powdered potassium silicate or any other silicon-based compounds (for example silanes).

As a source of aluminium, there can be used aluminates of alkaline metals; as a source of boron, there can be used ammonium, potassium or sodium metaborates and tetraborates as well as boric acid $H_3BO_3$.

During or after the wet grinding, the pigment can still go through a surface treatment so as to improve its heat and light resistances. The pigment is covered with a coating—which can also be precipitated on its surface—based on well known inorganic or organic compounds: the oxides, hydrates, phosphates, esters, carbonates, silicates of titanium, aluminium, antimony, zirconium, hafnium, boron, rare earths, silicon, calcium, barium magnesium and strontium are currently used.

The so obtained pigments are particularly convenient to dye plastics and industrial paints.

With respect to other manufacturing processes such as dry or wet mixing of powders, direct calcination, precipitation followed by an aging without calcination, the advantages of this two step method, that means a co-precipitation followed by an oxydative calcination are significant:

- the co-precipitation assures a perfect mixing of the pigment components which are formed simultaneously in situ
- the calcination temperature can so be adjusted very finely and is thus less high. It is also possible to work without any flux or other additive.
- the calcination time is reduced; generally 1 hour is sufficient
- the co-precipitation reaction is a chemical reaction with a yield of 100%;
- the mother-waters are thus exempt of ions such as bismuth, vanadate, molybdate, phosphate, zinc, . . . and polluted and/or uneasily purifiable rejections can be avoided. Particularly the presence of silicate as well as aluminate or borate makes possible a stoichiometric precipitation which is not easily obtained or with high difficulty in presence of other anions of phosphate, fluoride, . . . types.
- that process of manufacturing makes possible to obtain a pigment of bismuth vanadate with a high purity and a high coloring power, although it contains a large quantity of molybdate; thus the ratio Mo/V est comprised between 0.5 and 0.75 with extremes comprised between 0.4 and 0.85, whereas according to other conventional processes (dry mixing, direct calcination, precipitation without calcination), the ration Mo/V must be comprised in a range of 0 to 0.25 in order to obtain the same qualities in terms of color and coloring power. According to the process of the present invention, a pigment of excellent quality is obtained for a well lower cost of raw materials.

Nevertheless the most conventional processes of preparation of pigments according to the present invention also lead to good results. Particularly there can be mentioned processes of direct calcination or precipitation with crystalline aging without further calcination.

In the case of direct calcination, a bismuth compound is mixed very intensively with vanadium, molybdenum, tungsten, silicon, ... in a mechanic mortar or in a mixer-breaker. As bismuth compounds, there can be used neutral or basic nitrate, trioxide, phosphate, subcarbonate, basic acetate or any other bismuth compound which is able to be converted into oxide under temperature action. For the other components, namely molybdate, vanadate, silicate, phosphate, tungstate, aluminate, borate, ... any combination which can produce an oxide or an oxygenated ion in the calcination step can be used.

For example, an intimate mixture can be made in an intensive mixer of bismuth oxide $Bi_2O_3$ with conveniently dosed quantities of vanadium pentoxide $V_2O_5$, sodium metasilicate $Na_2SiO_3$ and molybdenum oxide $MoO_3$, the case being one of those compounds can be totally or partially substituted by sodium aluminate, bismuth phosphate, talc, boron oxide, tungsten trioxide or any other low solubility oxygenated compound based on silicon, vanadium, phosphorus, boron, aluminium, ...

The mixing can also be carried out by intimate dispersion of the various components in a turbine under strong agitation in an aqueous medium; this mixture is then dried at a temperature of about 100°–130° C. and finally ground in a mortar and calcinated according to the conditions described in those processes.

The mixture is calcinated in a kiln during 1 to 50 hours, preferably during a time of 3 to 8 hours at temperatures comprised between 400° and 1100° C., and preferably between 650° and 850° C. The optimum temperature depends on the relative composition of the mixture to be calcinated. High temperatures assure a quicker solid phase reaction, but beyond a certain temperature, the mixture melts and gives a hard and less pigmentary mass. In the presence of tungsten, the limit melting temperature is higher than with molybdenum or boric acid. Generally temperatures near 750° C. will be preferably chosen. Calcination time can vary from 1 to 50 hours; however it will be longer for low temperatures than for high temperatures. With temperature values comprised between 700° and 800° C., calcination takes usually times comprised between 3 and 8 hours. It is sometimes interesting to shorten the calcination time by calcinating in a first step at 650° C., then grinding the calcinated product and calcinating it again in a second step at 750°–800° C.

The calcinated product is slowly cooled and then ground in a wet medium in a ball mill. This grinding allows, contrary to a possible dry grinding, a pigment of pure color the particles of which have normal pigmentary dimensions of the order of one micron, to be obtained. After the wet grinding, the obtained product is washed, dried and dry ground.

The following examples are given to illustrate the present invention.

Control example 1 (bismuth molybdovanadate)

A control sample is prepared by the following procedure:

An acid solution of 107.7 g of bismuth nitrate (specific weight 1.607 g/cm³) is poured in a 5 l reactor. The volume is adjusted to 0.570 l by adding hot water and the temperature is adjusted to 70° C.

Under agitation an addition is made of an aqueous solution containing 14.779 g sodium vanadate and 18.333 g sodium molybdate in 3.6 l water. The addition is made in 2 hours. During that addition the pH of the reaction mixture goes up gradually up to 0.5; it is then adjusted to 4.5 by drop addition of 63 ml of 50% caustic soda. After a further agitation of one hour at a temperature of 70° C., the pH is stabilized at 3.8. The mixture is then filtered, washed with water and dried during 12 hours at 90° C. There are obtained 85.5 g raw product which are then calcinated during 1 hour at 620° C. The yellow pigment obtained is ground in a pearl mill. After filtration, drying and grinding, a pigmentary powder is obtained with the following composition:

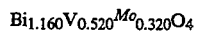

$Bi_{1.160}V_{0.520}Mo_{0.320}O_4$ (x=1, y=0.32)

That pigment forms a good control standard for the other examples.

Control example 2 (pure bismuth vanadate)

A sample of pure bismuth vanadate is prepared according to the procedure of example 1, except that the sodium molybdate is omitted: to 48.98 g bismuth nitrate are added 15.12 g sodium metavanadate. A yellow pigment is then obtained with the following composition:

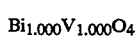

$Bi_{1.000}V_{1.000}O_4$ (x=1, y=0) the color of which can be compared to reference one.

Example 3 (bismuth silicovanadate)

According to the procedure described in example 1, a bismuth silicovanadate is prepared by mixing 102.240 g bismuth nitrate, 28.700 g sodium vanadate and 3.750 g sodium metasilicate. A bright yellow pigment is obtained of the following composition:

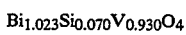

$Bi_{1.023}Si_{0.070}V_{0.930}O_4$ (x=0.93, y=0)
the coloring power and opacity of which are well higher than those of the pure bismuth vanadate of example 2.

Example 4 (bismuth silicomolybdovanadate)

54.250 g bismuth nitrate [acid solution containing 22.6% $Bi(NO_3)_3$] are poured in a 3 l receptacle. Volume is adjusted to 0.285 l by adding water and temperature is brought to 70° C. To that solution of non hydrolyzed bismuth nitrate is added in one hour a solution of 6.510 g sodium vanadate $NaVO_3$, 9.700 g sodium molybdate $Na_2MoO_4.2H_2O$ and 0.650 g sodium metasilicate $Na_2SiO_3.5H_2O$ in 1.8 l water at 70° C. After that addition, pH is adjusted to a value of 2 by addition of caustic soda in concentrated aqueous solution. Agitation is continued for 2 hours while maintaining temperature at 70° C. Then the product is filtrated by suction, washed carefully with water and dried in an aerated stove at 85° C. during 12 hours. The raw pigment is then reduced into a powder and calcinated during 90 minutes at 625° C. 43 g of pure yellow pigment are thus obtained which are ground finely in an aqueous medium in a pearl-mill. Finally after filtration, drying and grinding a yellow pigmentary powder is obtained with the following composition:

$$Bi_{1.181}Si_{0.0026}V_{0.458}Mo_{0.344}O_4$$

(x=0.974, y=0.353)
the coloring power of which is higher than the control one of example 1.

Example 5 (bismuth silicomolybdovanadate)

According to the procedure described in example 1, a bismuth silicomolybdovanadate is prepared by adding 53.325 g bismuth nitrate, 6.10 g sodium metavanadate, 9.075 g sodium molybdate and 1.7 g sodium metasilicate $Na_2SiO_3.5H_2O$. Consequently a bright light yellow pigment is obtained with the following composition:

$$Bi_{1.187}Si_{0.066}V_{0.441}Mo_{0.329}O_4$$

(x=0.934, y=0.352)
the coloring power of which is higher than the control one (20-25%).

Example 6 (bismuth silicomolybdovanadate)

According to the procedure described in example 1, a mixture is prepared with 55.3 g bismuth nitrate, 4.68 g ammonium vanadate, 7.26 g sodium molybdate and 7.15 g sodium silicate (25.2% $.SiO_2$ solution). A yellow pigment is obtained with the following composition:

$$Bi_{1.217}Si_{0.261}V_{0.348}Mo_{0.261}O_4$$

(x=0.739, y=0.353)
the coloring power of which is not higher than the control one of example 1 because of the silicate excess.

Example 7 (bismuth phosphovanadate)

50.659 g bismuth nitrate (acid solution of pH=0 containing 22.6 weight % bismuth) are poured in a 3 l receptacle.

Volume is adjusted to 0.25 l by water addition and temperature is brought to 75° C.

In one hour that non hydrolyzed solution of bismuth nitrate is added with a solution of 6.585 g sodium vanadate $NaVO_3$, 8.167 g sodium molybdate and 0.602 g 100% phosphoric acid in 1.6 l water at 80° C.

After that addition, pH is adjusted to 2 by adding caustic soda in a concentrated aqueous solution.

Agitation of the pigment is continued during 2 hours while maintaining the temperature between 70° and 80° C. Then filtration is carried out by suction, the product is carefully washed with water and dried in an aerated stove at 80° C. during 12 hours. The raw pigment is then reduced into powder and calcinated during 1.30 hours at 620° C. In such a way 40 g pure yellow pigment are obtained which are finely ground in an aqueous medium in a pearl-mill. Finally after filtration, drying and grinding, a yellow pigmentary powder is obtained with the following composition:

$$Bi_{1.152}V_{0.485}P_{0.061}Mo_{0.303}O_4$$

(x=1, y=0.303, P/V=0.126)

Example 8 (bismuth phosphomolybdovanadate)

According to the procedure described in examples 1 and 2, a bismuth phosphomolybdovanadate is prepared by mixing 52.14 g $Bi(NO_3)_2$, 5.85 g $NaVO_3$, 8.712 g sodium molybdate and 1.390 g phosphoric acid. Finally a light yellow pigment is obtained with the following composition:

$$Bi_{1.158}V_{0.421}P_{0.105}Mo_{0.316}O_4$$

(x=1, y=0.316, P/V=0.25)
the color of which is comparable to the control and the coloring power 7% higher.

Example 9 (bismuth phosphomolybdovanadate)

According to the procedure described in examples 1 and 2, a bismuth phosphomolybdovanadate is prepared by mixing 50.030 g bismuth nitrate, 6.07 g sodium metavanadate, 8.903 g sodium molybdate and 0.650 g phosphoric acid. Finally a bright light yellow pigment is obtained with the following composition:

$$Bi_{1.167}V_{0.450}P_{0.050}Mo_{0.333}O_4$$

(x=1, y=0.333, P/V=0.111)
the coloring power of which is higher than the control one (20%)

Example 10 (bismuth silicoborovanadate)

According to the procedure described in example 1, a bismuth silicovanadate is prepared in which a part of silicon is substituted by boron by mixing:
99.225 g bismuth nitrate $Bi(NO_3)_3.5H_2O$
9.120 g ammonium metavanadate $NH_4VO_3$
14.142 g sodium molybdate $Na_2MoO_4.2H_2O$
0.375 g boric acid $H_3BO_3$
1.425 g Sodium silicate in a 25.8% $SiO_2$ solution There is obtained a light yellow pigment corresponding perfectly to examples 4 and 5 in color as well as in coloring power.

Example 11 (bismuth phosphosilicovanadate )

According to the procedure described in example 1, a bismuth silicovanadate is prepared where a part of the vanadium is substituted by phosphorus, by mixing a solution of 104.260 g bismuth nitrate and an aqueous solution containing 12.175 g sodium vanadate, 1.790 g sodium metasilicate, 17.975 g sodium molybdate and 0.645 85% phosphoric acid. A yellow pigmentary powder is obtained with the following composition:

$$Bi_{1.176}Si_{0.066}V_{0.431}P_{0.105}Mo_{0.323}O_4$$

the coloring power of which is higher than the control one.

Example 12 (co-precipitation by simultaneous pourings)

2 × the quantities of the products of example 5 are used, but both solutions are added simultaneously in a 5 l reactor under strong agitation. Practically, firstly 30 ml of the acid solution of bismuth nitrate are poured, then both solutions are pumped simultaneously, the first one at a rate of 9 ml/min, the second one at a rate of 60 ml/min. The temperature of the reactor and its contents is maintained constant at 75° C. When both solutions are poured, they are stirred again 20 minutes, and then pH is brought from 1 to 4 by drop addition of 100 ml caustic soda at 30% The mixture is then filtrated, washed, dried and calcinated and treated as in example 1. A bright yellow pigmentay powder is obtained exactly similar to the product of example 5.

Example 13

In a small bladed mixer, 445 g basic bismuth carbonate, 52.5 g vanadium oxide, 6.5 g sodium metasilicate and 58 g molybdenum trioxide are mixed very intimately. This mixture is then poured in porcelain crucibles which are put in a muffle furnace. Calcination is carried out during 5 hours at 725° C. The calcinated product is then slowly cooled. The fragments are ground in an aqueous medium in a pearl-mill during 45 minutes. After filtration, washing, drying at 120° C. and dry grinding, a yellow pigmentary powder is obtained similar to the product of example 4.

The pigments obtained according to the present invention have excellent properties for coloration of paints and thermoplastics. Compared to the control pigment (example 1), the pigments obtained have higher purity, covering power and coloring power.

To compare the heat stability, the pigments according the present invention and the control pigments are each mixed with a plastics (PE.PP). The granules obtained are then extruded at different temperatures during 5 minutes.

To compare light solidness, the pigments according to the present invention and the control pigments are incorporated each into a paint the various samples of which are exposed to light (QV) and weathering agents.

|  | Colour | Colouring power |
|---|---|---|
| Example 1 control Bi (V, Mo) O$_4$ |  | 100 |
| Example 2 Bi V O$_4$ | orange yellow | 100 |
| Example 3 Bi (Si V) O$_4$ | light yellow | 110 |
| Examples 4 and 13 Bi (Si V Mo) O$_4$ | light yellow | 115 |
| Examples 5 and 12 Bi (Si V Mo) O$_4$ | light yellow | 125 |
| Example 6 Bi (Si V Mo) O$_4$ | light yellow | 100 |
| Example 7 Bi (V, P) Mo O$_4$ | bright yellow | 112 |
| Example 8 Bi (V, P) Mo O$_4$ | light yellow | 105 |
| Example 9 Bi (V, P) Mo O$_4$ | light yellow | 123 |
| Example 10 Bi (Si B V Mo) O$_4$ | light yellow | 115 |
| Example 11 Bi (Si V P MO) O$_4$ | light yellow | 115 |

It can be seen clearly that in the compounds of formula I where $1-x$ is comprised between 0 and 1/8, the addition of bismuth phosphate and/or bismuth silicate improves the quality of the pigment obtained: bright pure color and better coloring power.

Figure 2:
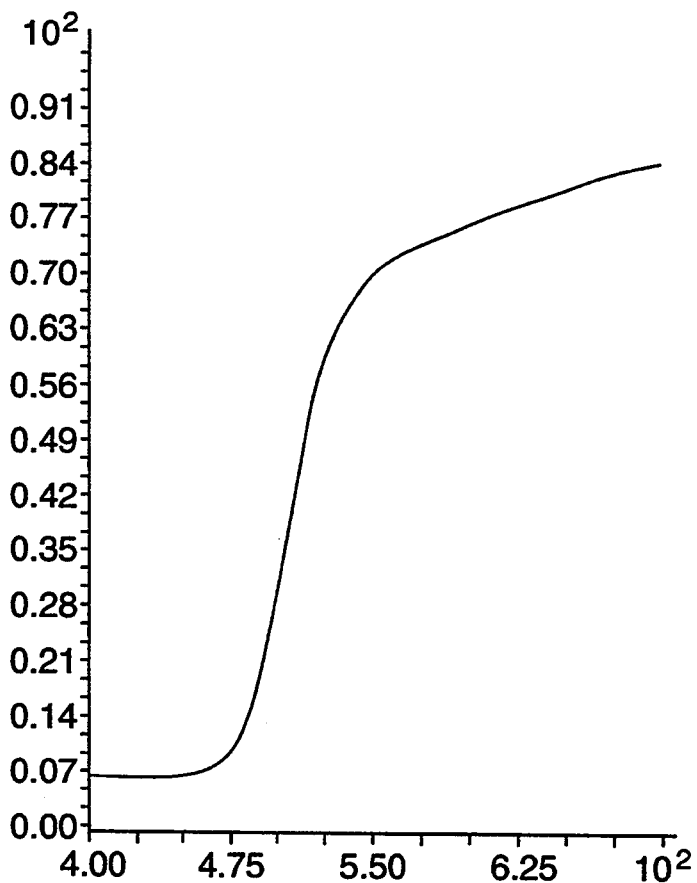
Figure 3:
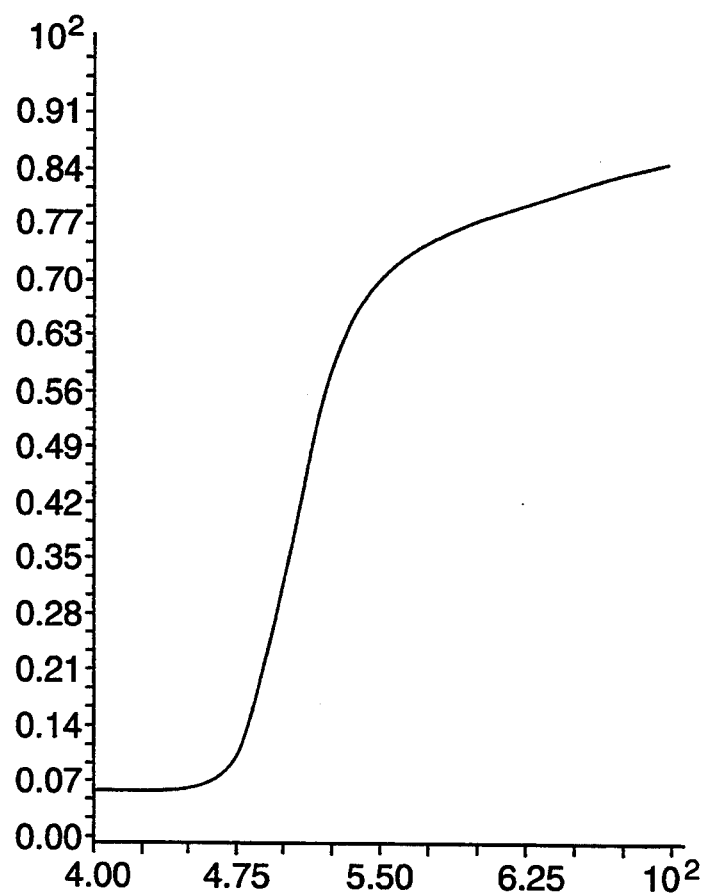
Figure 4:
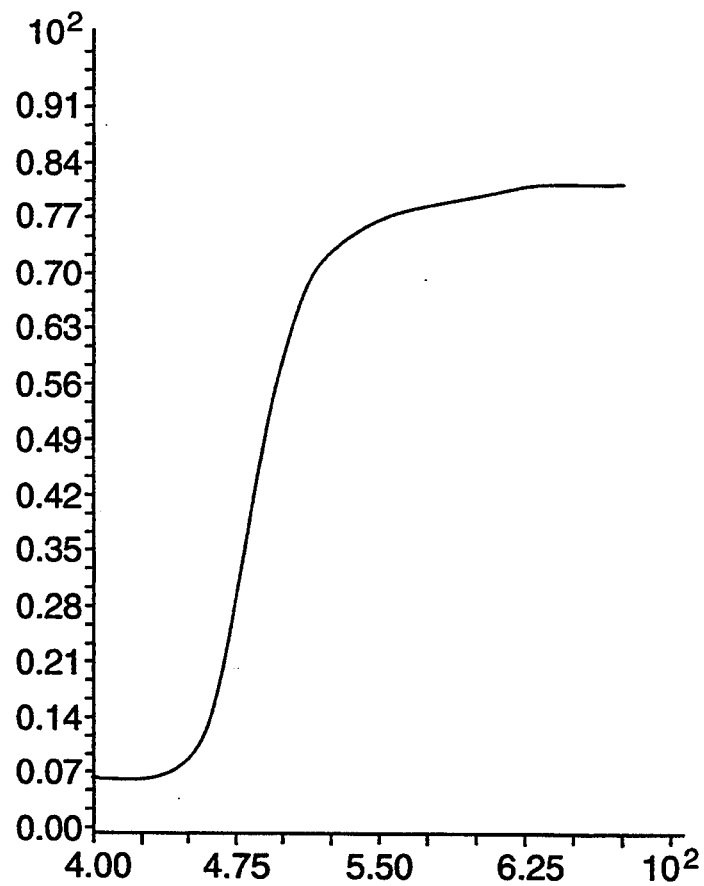
Figure 5:
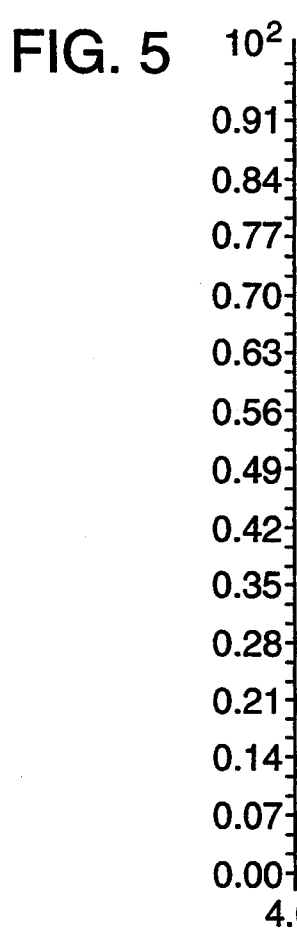
Figure 6:
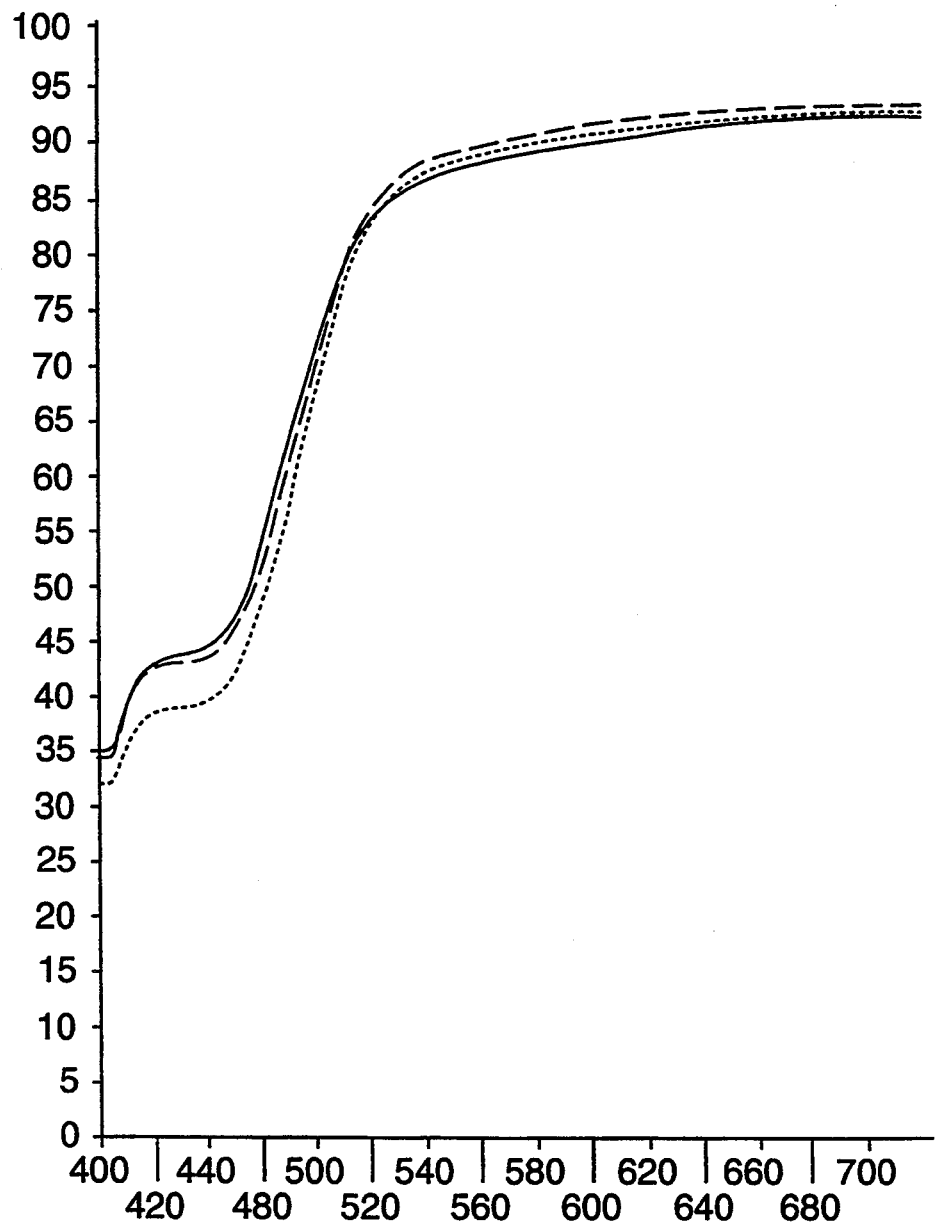
Figure 7:
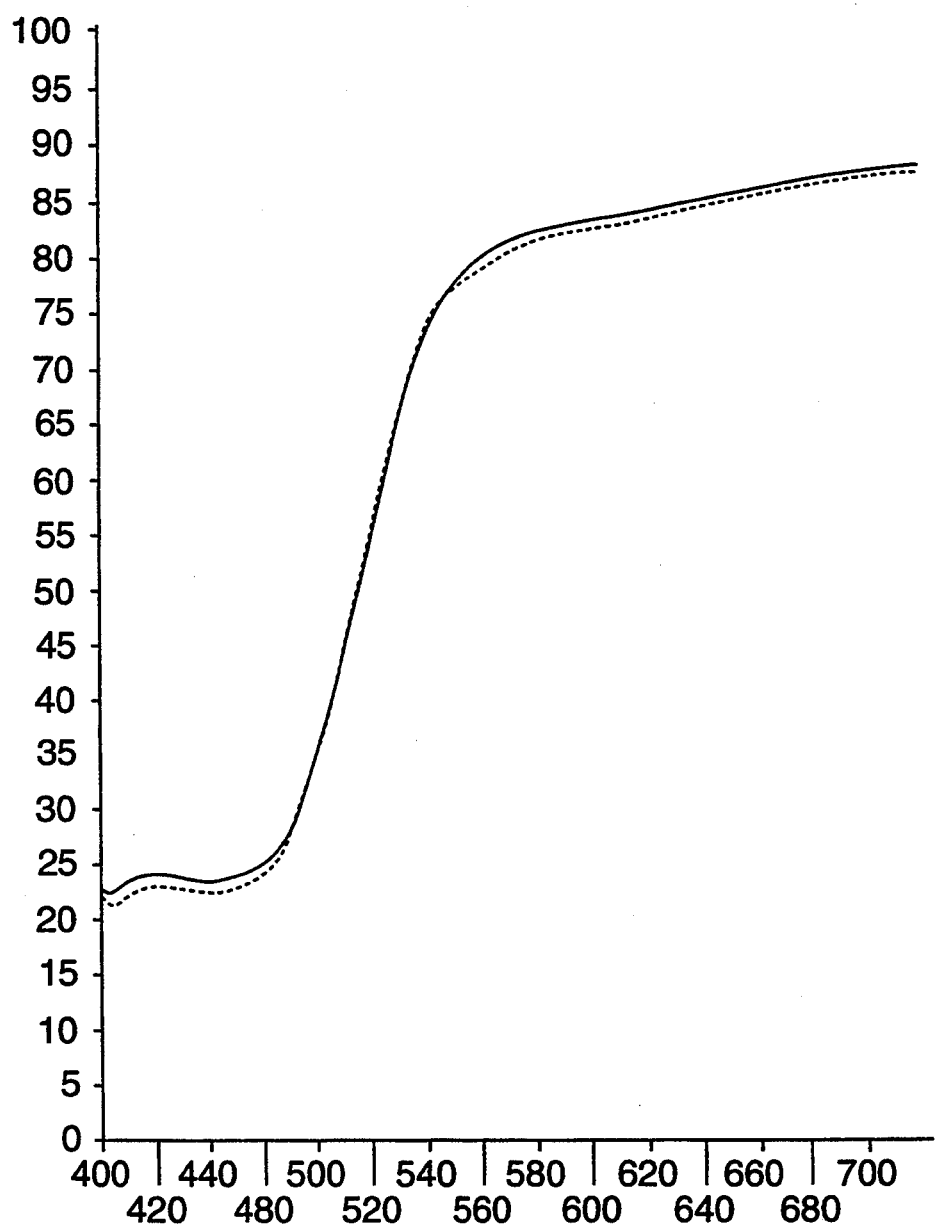

In the annexed figures, the results have been represented under the form of spectral curves of two controls, two silicovanadates, one phosphovanadate as well as measurements of the coloring power of two silicovanadates compared to their control (FIGS. 1 to 7).

We claim:

1. A bismuth-vanadate-based yellow inorganic pigment, having the formula:

where:
L is selected from the group consisting of Si, and
the combination of Si and one or more of the elements selected from the group consisting of Ti, Oe, and Zr, and the combination of Si, one or more of the elements selected from the group consisting of Ti, Ge, and Zr, and one or more of the elements selected from the group consisting of B, Al, Oa, In and Tl;

M is selected from the group consisting of V, and
the combination of V and one or more of the elements selected from the group consisting of V, Nb, Ta, Unp and P;

N is an element selected from the group consisting of Mo and W;

$1 \leq a \leq 4/3$;
$0 \leq b < 1$;
$0 < c \leq 1$; and
$0 \leq d < 1$;

provided that if c is greater than zero and b is equal to zero then M is V and one or more of the elements selected from the group consisting of V, Nb, Ta, Unp and P;

further provided that if b and d are equal to zero then M does not include P.

2. The pigment of claim 1 having the formula:

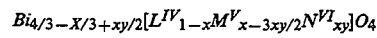

where:
Bi is a trivalent ion;
L is one or more of the ions selected from the group consisting of tetravalent ions and trivalent ions "of the elements Si, Ti, Ge, Zr, B, Al, Ga, In and Tl";
M is a pentavalent ion mixture of vanadium ions and one or more ions selected from the group consisting of phosphorus ions and ions of V, Nb, Ta and Unp; provided that the ratio of vanadium ions to the other ions in the mixture is greater than or equal to one;
N is a hexavalent ion of an element selected from the group consisting of molybdenum and tungsten;
$0 < 1-x < 1/8$; and
$0 < xy < 2/3$.

3. The pigment of claim 1 wherein d has a value between 0 and 2/3.

4. The pigment of claim 1 wherein the ratio of vanadium to phosphorus is between 4 and 100.

5. A process of manufacturing a bismuth-vanadate-based yellow inorganic pigment comprising the steps of:
(a) mixing an acid solution of bismuth nitrate with an aqueous solution of vanadate ions and one or more aqueous solutions selected from the group consisting of aqueous solutions of phosphate ions, silicate ions, molybdate ions, tungstate ions, Ti salts, Ge salts, Zr salts and Nb salts to form a precipitate and mother-waters;
(b) separating the precipitate from the mother-waters;
(c) washing the precipitate; and,
(d) calcining the precipitate at a temperature of 400° to 700° C. for 0.5 to 5 hours to form a calcinated pigment.

6. The process of claim 5 wherein the ratio of phosphate ions to vanadate ions is greater than or equal to 0 and less than or equal to 1.

7. The process of claim 5 wherein the ratio of silicate ions to ions of the group consisting of B, Al, Ga, In and Tl is between 0 and 1.

8. The process of claim 5 further comprising the step of maintaining the solutions at a temperature ranging from about 20° to about 100° C.

9. The process of claim 8 wherein the acidity of the solution is reduced by the addition of base.

10. The process of claim 9 where the base comprises one or more bases selected from the group consisting of caustic soda, sodium carbonate, potassium hydroxide and ammonia water.

11. The process of claim 5 further comprising the step of maintaining the solutions of a temperature ranging from about 40° to about 80° C.

12. The process of claim 5 wherein the precipitate is aged for 0.5 to 5 hours before it is separated from the mother-waters.

13. The process of claim 8, further comprising the steps of:
 (a) cooling the calcinated pigment in a wet environment; and,
 (b) grinding the calcinated pigment in a wet environment.

14. The process of claim 13, further comprising the step of subjecting the calcineted pigment to a surface treatment to improve the pigment's heat and light resistances, the surface treatment comprising the step of coating the pigment with a compound selected from the group consisting of oxides, hydrates, phosphates, esters, carbonates, titanium silicate, aluminum, antimony, zircon/urn, hafnium, boron, silicon, magnesium, calcium, barium, strontium, La, Ce, Pr, Nd, Pm, Sm, Eu, Gd, Tb, Dy, Ho, Er, Tm, Yb and Lu.

15. The process of claim 14, further comprising the steps of:
 (a) filtering the calcinated pigment to form a filtered pigment;
 (b) washing the filtered pigment to form a washed pigment;
 (c) drying the washed pigment to form a dried pigment; and,
 (d) reducing the dried pigment to powder.

16. The process of claim 14 wherein the step of coating the pigment is accomplished by precipitating a coating onto the pigment's surface.

17. A process of manufacturing a bismuth-vanadate-based yellow inorganic pigment comprising the steps of:
 (a) mixing powders of bismuth compounds, vanadium ions and one or more ions selected from the group consisting of the ions of silicon and phosphorus, and
 (b) calcining the resulting mixture at a temperature ranging from about 400° to about 1100° C. for a period of time ranging from about 1 to about 50 hours.

18. The process of claim 17 wherein the step of mixing includes mixing powders of bismuth compounds and powders of one or more ions selected from the group consisting of molybdenum, tungsten, titanium, germanium, zirconium, niobium, aluminum, and boron ions.

19. In a method for coloring plastic or industrial paint, the improvement comprising using the pigment of claim 1 as a colorant.

* * * * *